United States Patent
Saya (12) United States Patent (Saya)

(10) Patent No.: US 9,620,300 B2
(45) Date of Patent: Apr. 11, 2017

(54) ELECTROCHEMICAL DEVICE

(71) Applicant: TDK Corporation, Tokyo (JP)

(72) Inventor: Yuko Saya, Tokyo (JP)

(73) Assignee: TDK Corporation, Tokyo (JP)

(*) Notice: Subject to any disclaimer, the term of this patent is extended or adjusted under 35 U.S.C. 154(b) by 212 days.

(21) Appl. No.: 14/515,031

(22) Filed: Oct. 15, 2014

(65) Prior Publication Data
US 2015/0103470 A1 Apr. 16, 2015

(30) Foreign Application Priority Data
Oct. 16, 2013 (JP) ................... 2013-215637

(51) Int. Cl.
*H01G 11/42* (2013.01)
*H01G 11/80* (2013.01)
*H01G 11/26* (2013.01)
*H01G 11/74* (2013.01)
*H01G 11/82* (2013.01)

(52) U.S. Cl.
CPC ............ *H01G 11/80* (2013.01); *H01G 11/26* (2013.01); *H01G 11/74* (2013.01); *H01G 11/82* (2013.01); *Y02E 60/13* (2013.01)

(58) Field of Classification Search
CPC H01G 9/15; H01G 9/02; H01G 9/155; H01G 9/00; H01G 9/016; H01G 11/28; H01G 11/42; H01G 11/02
See application file for complete search history.

(56) References Cited

U.S. PATENT DOCUMENTS

| | | | |
|---|---|---|---|
| 2005/0034299 A1* | 2/2005 | Kurihara | H01G 9/155 29/623.5 |
| 2012/0040231 A1* | 2/2012 | Hagiwara | H01G 9/016 429/136 |
| 2012/0082892 A1* | 4/2012 | Kobayashi | H01M 4/134 429/211 |

FOREIGN PATENT DOCUMENTS

| | | |
|---|---|---|
| EP | 1 830 374 A1 | 9/2007 |
| JP | 2006-49670 A | 2/2006 |
| WO | WO 2013/133039 A1 | 9/2013 |

* cited by examiner

*Primary Examiner* — Nguyen Ha
(74) *Attorney, Agent, or Firm* — Arent Fox LLP (57) ABSTRACT

An electrochemical device comprises an element body 10 in which a pair of a first inner electrode and a second inner electrode are laminated to sandwich a separator layer; an exterior sheet 4 covering the element body; a first lead terminal 18 drawn to an outside of the exterior sheet 4; and a second lead terminal 28 drawn to the outside of the exterior sheet 4. A proof stress of the exterior sheet is 390 to 980 N/mm$^2$ in JIS Z2241, and a hardness of the exterior sheet is 230 to 380 Hv in Vickers hardness (JIS Z2244).

21 Claims, 11 Drawing Sheets

ELECTROCHEMICAL DEVICE

CROSS REFERENCE TO RELATED APPLICATIONS

This application claims priority to Japanese Patent Application No. 2013-215637, filed Oct. 16, 2013, the disclosure of which is hereby incorporated by reference in its entirety.

BACKGROUND OF THE INVENTION

1. Field of the Invention

The present invention relates to an electrochemical device preferably used as an electric double-layered capacitor (EDLC) and the like. In more detail, the present invention relates to the electrochemical device enabling thinning and further having excellence in bending resistance.

2. Description of the Related Art

Recently, the spread of IC cards loading IC chips is really astonishing. Especially, there are IC cards allowing transfer of money, and IC cards are used for various usage such as employee IDs or membership cards. In the future, further measures addressing high functionalization thereof are being required.

Thus, IC cards using secondary batteries need to be developed. However, conventional electrochemical devices have a thickness of 1 mm or larger, and thus they do not cope with bending. Then, as shown in such as Patent Document 1, the electrochemical devices for thinning are proposed.

However, in order to insert the conventional electrochemical devices into IC cards or so, they need to be further thinned. Also, in the future, in accordance with high functionalization of IC cards, usage of electrochemical devices for products having thin and flexible base materials is being widened, and flexible electrochemical devices are being needed.

On the other hand, structures of the conventional electrochemical devices such as EDLCs have a problem in generation of wrinkles at the time of bending. Also, the conventional electrochemical devices particularly have a problem that wrinkles are easily generated on a space between a seal part of product peripheral edge and inner elements.

[Patent Document 1] JP Patent Application Laid Open No. 2006-49670

SUMMARY OF THE INVENTION

The present invention is accomplished in view of such situation, and the object is to provide an electrochemical device enabling thinning and further having excellence in bending resistance.

In order to achieve the above mentioned object, the electrochemical device according to the first aspect of the present invention comprises:

an element body in which a pair of a first inner electrode and a second inner electrode are laminated to sandwich a separator layer;

an exterior sheet covering the element body;

a first lead terminal which is electrically connected to the first inner electrode and is drawn to an outside of the exterior sheet; and a second lead terminal which is electrically connected to the second inner electrode and is drawn to the outside of the exterior sheet, wherein a proof stress of the exterior sheet is 390 to 980 N/mm$^2$ in JIS Z2241 and a hardness of the exterior sheet is 230 to 380 Hv in Vickers hardness (JIS Z2244).

Since the electrochemical device according to the present invention has the above structure, it is possible to make the device have the thickness of 1 mm or less, preferably 0.8 mm or less, and to enable the device to be thinned. Also, since the electrochemical device according to the present invention has the proof stress of the exterior sheet which is in a predetermined range and has the hardness of the exterior sheet which is in a predetermined range, it has sufficient resistance against repeated bending.

Note that, conventional electrochemical devices are weak against repeated bending and have generation of wrinkles on exterior bodies. For example, the reason for causing the wrinkles can be explained as follows. When a device is bent, a stress is added to a central portion of an element, a liquid electrolyte solution stored inside the element starts oozing out of the element, and it is collected in a space between the element and a seal. At the time, the stress of the electrolyte solution swells the space largely, and then wrinkles occur. The amount of oozing of the electrolyte solution is determined by an area of the element, the amount of liquid injection, and the stress during the bending.

In this case, when the proof stress of the exterior body (the exterior body's durable deformation stress) is made large, the exterior body can cope with the pressure of the electrolyte solution and can prevent wrinkles from occurring. When a material which is soft like rubber and has a high resilience is used as the exterior body, the current collector of inner electrodes may have wrinkles, if excessive bending is performed. The wrinkles cause capacity lowering due to reduction of facing area and generation of short circuit due to separator abrasion. Also, an electrochemical element having suitable hardness is easy to be handled as a device. Note that, when the hardness is too large, it is difficult to follow a steep deformation of the exterior body sheet such as lead step and element step. As a result, cracks occur.

Preferably, a peripheral edge of the exterior sheet is sealed by a seal part so that the element body is immersed in an electrolyte solution and the first lead terminal and the second lead terminal are drawn to an outside of the seal part at mutually opposite positions along a longitudinal direction of the first inner electrode and the second inner electrode.

By having such a structure, the electrochemical device can be further downsized with excellent bending resistance.

Preferably, sealing tapes sandwiching the first lead terminal and the second lead terminal respectively are inserted between the peripheral edges of the exterior sheet and thermally sealed, in order that the seal part is partially formed. Preferably, a width of the seal part corresponding to a length of the sealing tape is 1 mm or more. The larger the width of this seal part is, the more effective the measure of the electrolyte solution is, and bending resistance of the device is then improved.

Preferably, the electrochemical device further comprises a support sheet which prevents bending of the first lead terminal and the second lead terminal drawn from the seal part. By having such a structure, the first lead terminal and the second lead terminal which are drawn from the seal part can be effectively prevented from bending.

Preferably, the support sheet is formed by outwardly extending a part of a peripheral edge of the exterior sheet located at the seal part. By having such a structure, the support sheet can be easily formed.

Preferably, a protruding length of the support sheet is longer than that of the first lead terminal and the second lead terminal. By having such a structure, the first lead terminal and the second lead terminal which are drawn from the seal part can be effectively prevented from bending.

DESCRIPTION OF THE PREFERRED EMBODIMENTS

Hereinafter, the present invention will be described based on embodiments shown in the figures.

First Embodiment

Figure 1A:
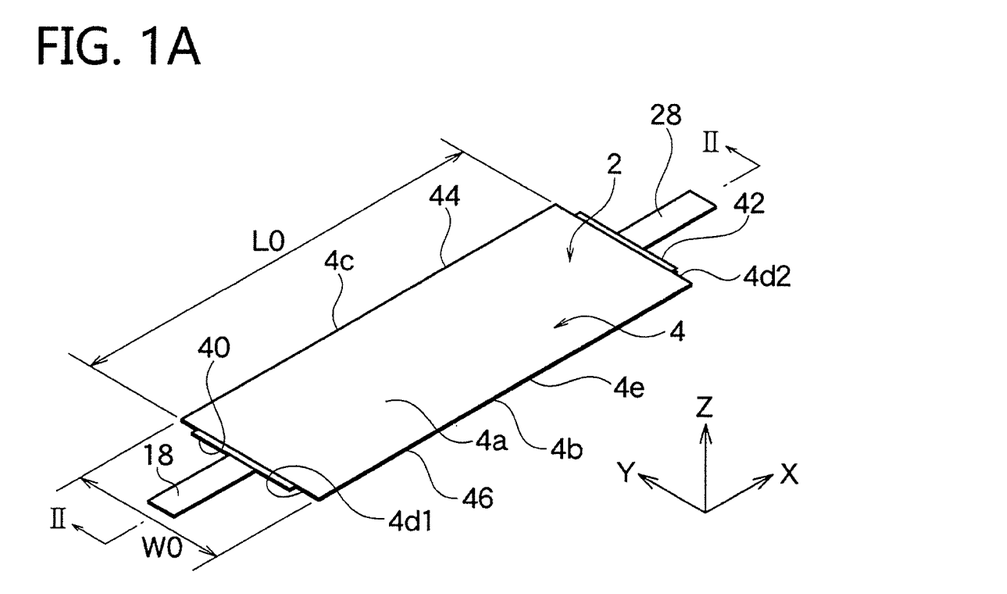
FIG. 1A is a perspective view of the electric double-layered capacitor according to one embodiment of the present invention.

As shown in FIG. 1A, an electric double-layered capacitor (EDLC) 2 as an electrochemical device according to one embodiment of the present invention has an exterior sheet 4. A surface 4a and a rear surface 4b are formed on the exterior sheet 4 by folding the single sheet 4 and bending it at a peripheral edge 4c.

In the present embodiment, the exterior sheet 4 has a rectangular shape whose length L0 in the X-axis direction is longer than the length W0 in the Y-axis direction. However, the present invention is not limited to this, and the exterior sheet 4 may have a square, other polygonal, circular, elliptic, or other shape. In this embodiment, it is considered that a direction where the surface 4a and the rear surface 4b of the exterior sheet 4 overlap is a thickness direction (Z-axis direction), and that directions perpendicular to one another are the X-axis and the Y-axis, respectively.

As described below with FIG. 2, an element body 10 is included in the exterior sheet 4. A pair of first lead terminals 18 and 28 drawn from the element body 10 extends to the outside of the exterior sheet 4.

As shown FIG. 1A, in the present embodiment, the inside of the rectangular exterior sheet 4 is sealed to be surrounded by a first seal part 40, a second seal part 42, a third seal part 44, and a fourth seal part 46, which are formed along four sides of the exterior sheet 4.

In this embodiment, a sealed part where the lead terminal 18 is outwardly drawn in the X-axis direction at a peripheral edge 4d1 of the exterior sheet 4 is defined as the first seal part 40. Also, a sealed part where the lead terminal 28 is outwardly drawn in the X-axis direction at a peripheral edge 4d2 of the exterior sheet 4 is defined as the second seal part 42. The first seal part 40 and the second seal part 42 are located opposite to each other in the X-axis direction of the exterior sheet 4. Also, a sealed part where the exterior sheet 4 is folded at a peripheral edge 4c is defined as the third seal part 44, and a sealed part of a side peripheral edge 4e of the exterior sheet 4 located opposite to the third seal part 44 in the Y-axis direction is defined as the fourth seal part.

Figure 2:
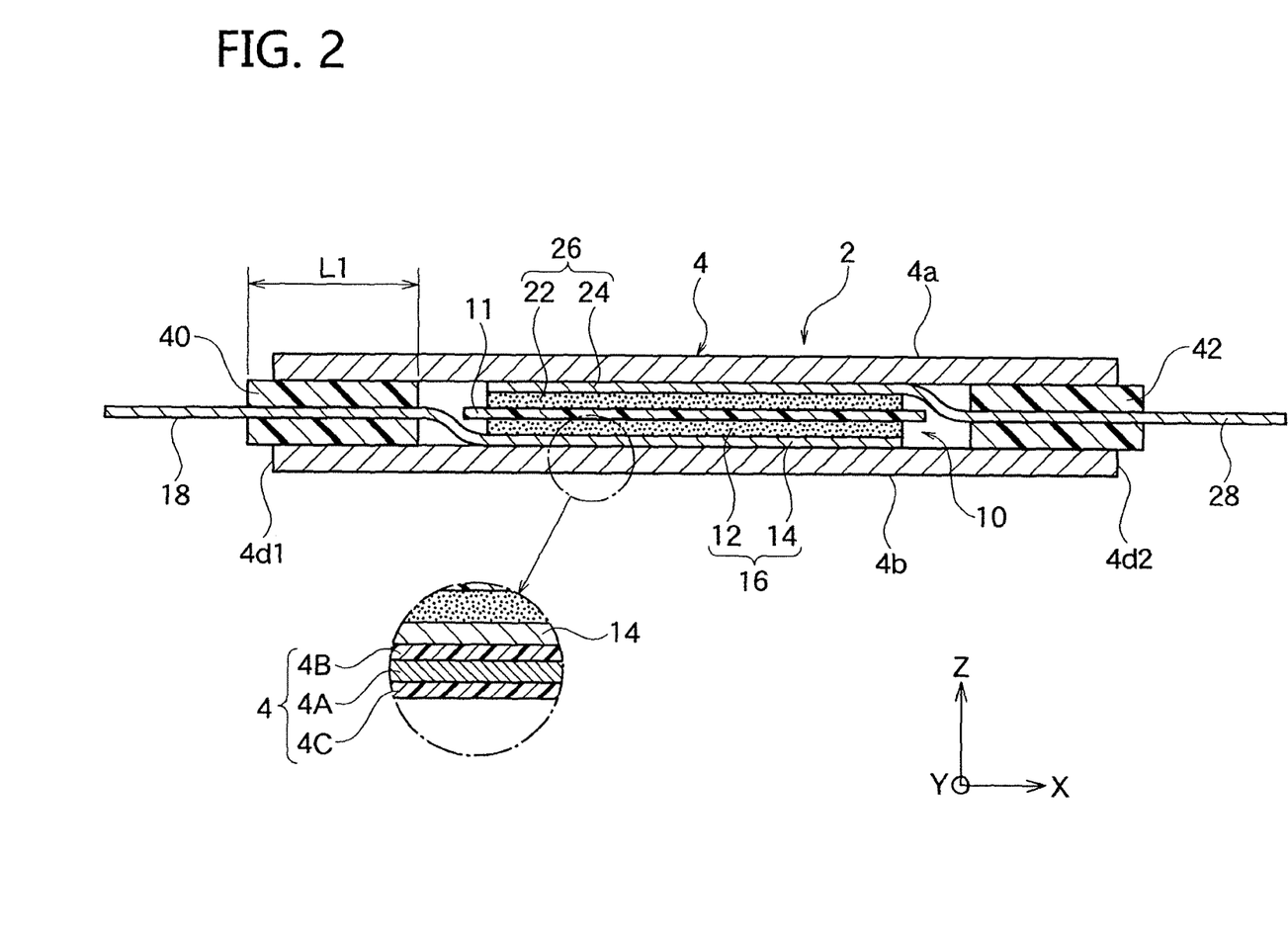
FIG. 2 is a schematic cross-sectional view taken along II-II line of FIG. 1A.

As shown in FIG. 2, the element body 10 is built in the exterior sheet 4. The element body 10 is comprised of an element of the electric double-layered capacitor. In the present embodiment, a single capacitor element is built in the exterior sheet 4.

In the element 10, a pair of a first inner electrode 16 and a second electrode 26 is laminated so as to sandwich a separator layer 11 soaked in an electrolyte solution. One of the first inner electrode 16 and the second inner electrode 26 is a cathode, and the other is an anode, but both of them have the same structure. The first inner electrode 16 and the second inner electrode 26 have a first activation layer 12 and a second activation layer 22, which are laminated so as to contact the mutually opposite faces of the separator layer 11, respectively. Also, the first inner electrode 16 and the second inner electrode 26 have a first current collector layer 14 and a second current collector layer 24, which are laminated so as to contact the activation layers 12 and 22, respectively.

The separator layer 11 has a permeable characteristic of electrolyte solution, while it electrically insulates between the inner electrodes 16 and 18. The separator layer 11 is composed of such as an electrically insulating porous sheet. As the electrically insulating porous sheet, a single layered film and multilayered films made of polyethylene, polypropylene or polyolefin, expanded films of mixture of the above-identified resins, or a fiber nonwoven fabric composed of at least one selected from a group of cellulose, polyester and polypropylene are exemplified. The thickness of the separator layer 11 is 5 to 50 μm or so, for example.

The current collector layers 14 and 24 are not particularly limited as far as they are composed of a material having generally high conductivity. However, a metal material having low electric resistance is preferably used, and a sheet such as copper, aluminum, or nickel is used, for example. The respective thickness of the current collector layers 12 and 22 is 15 to 100 μm or so, for example.

The activation layers 12 and 22 include active materials, binders and preferably include conductive assistants. The activation layers 12 and 22 are formed to be laminated on a surface of a sheet constituting each of the current collector layers 14 and 24.

As the active materials, a porous body having various electron conductivities is exemplified. For example, a carbon material such as activated carbon, natural graphite, artificial graphite, meso-carbon microbeads, meso-carbon fiber (MCF), cokes, glassy carbon, or organic compound sintered body etc. is exemplified. As the binder, it is not particularly limited as long as the above active materials and preferably the conductive assistants can be fixed on the sheet constituting the current collector layers, and various binders can be used. As the binder, for example, fluororesin such as polyvinylidene difluoride (PVDF) or polytetrafluoroethylene (PTFE) and a mixture of styrene butadiene rubber (SBR) with water-soluble polymer (carboxymethyl cellulose, polyvinyl alcohol, sodium polyacrylate, dextrin, or gulden etc.) and the like are exemplified.

The conductive assistants are materials added for enhancing the electron conductivities of the active layers 12 and 22. As the conductive assistant, for example, carbon material such as carbon black or acetylene black, metal fine powder such as copper, nickel, stainless or iron, mixture of the carbon material and the metal fine powder, and conductive oxide such as ITO are exemplified.

Each of the thickness of the activation layers 12 and 22 is preferably 1 to 100 μm or so, for example. The activation layers 12 and 22 are formed on surfaces of the current collector layers 14 and 24. Each area of the activation layers 12 and 22 is equivalent to that of the separate layer 11 or smaller than that of the respective current collector layers 14 and 24. The activation layers 12 and 22 can be produced by a known method.

In the present embodiment, the "cathode" is an electrode on which anion in the electrolyte solution is absorbed when voltage is applied to the electric double-layered capacitor, and the "anode" is an electrode adsorbed on which cation in the electrolyte solution is absorbed when voltage is applied to the electric double-layered capacitor. Note that, when the electric double-layered capacitor is recharged after once it is charged by applying voltage thereto in a certain positive or negative direction, the re-charging is ordinary performed in the same direction as the first one and is hardly performed by applying voltage in the opposite direction.

The exterior sheet 4 is preferably made of a material which prevents the electrolyte solution mentioned below from permeating. Further, the exterior sheet 4 is preferably integrated by thermally sealing both of the peripheral edges thereof or with a sealing tape 40a shown in FIG. 5. The sealing tape 40a preferably has a tape shape such as an adhesive tape because of work efficiency. However, it is not limited to the tape, and any form may be adopted, for example a coatable sealant resin and anything which is melted by heat and can be adhesive.

Also, the exterior sheet 4 is made by a sheet in which the element body 10 is sealed so that the air and fluid cannot enter into the sheet 4. Specifically, the exterior sheet 4 may be a single-layer sheet. However, as shown in FIG. 2, it is preferably a multilayer sheet in which a metal sheet 4A is laminated and inserted between an inner sheet 4B and an outer sheet 4C.

The metal sheet 4A is preferably composed of such as stainless. The inner sheet 4B is composed of electric insulation material and is preferably composed of a material similar to a bulkhead sheet such as polypropylene, which is hard to react with electrolyte solution and can be thermally sealed. Also, the outer sheet 4C is not particularly limited and is preferably composed of PET, PC, PES, PEN, PI, fluororesin, PE, or polybutylene terephthalate (PBT) etc. The thickness of the exterior sheet 4 is preferably 5 to 80 μm.

In the present embodiment, in JIS Z2241, the proof stress of the exterior sheet 4 is 390 to 1275 N/mm$^2$ and preferably 785 to 980 N/mm$^2$. Also, in Vickers hardness (Hv) (JIS 2244), the hardness of the exterior sheet is 230 to 480 and preferably 280 to 380. From this point of view, the metal sheet 4A of the exterior sheet 4 is preferably stainless, for example SUS304 (BA), SUS304 (1/2H), SUS304 H, SUS301 BA, SUS301 (1/2H), SUS301 (3/4H), and particularly preferably SUS304 (1/2H), which are defined by JIS.

The lead terminals 18 and 28 are conductive members having a role of input/output terminals of electric current to the current collector layers 14 and 24 and have rectangular plate shapes. In the present embodiment, each of the lead terminals 18 and 28 are formed by a sheet integrated with a conductive sheet respectively constituting the current collector layers 14 and 24 and may have the same thickness as with that of the current collector layers 14 and 24. Note that, the respective lead terminals 18 and 28 may be formed by conductive members different from those of the current collector layers 14 and 24, and may be electrically connected thereto. In this case, the thickness of the respective lead terminals 18 and 28 can be different from that of the current collector layers 14 and 24. For example, the thickness of the respective lead terminals 18 and 28 is 20 to 100 μm or so.

A space where the exterior sheet 4 surrounds and the element body 10 is sealed by the seal parts 40, 42, 44 and 46 is filled with an electrolyte solution (not shown), and the solution is partially impregnated into the activation layers 12, 22 and the separator layer 11.

As the electrolyte solution, a solution which an electrolyte is dissolved in an organic solvent is used. As the electrolyte, for example, quaternary ammonium salts such as Tetra ethyl ammonium tetra fluoroborate (TEA$^+$BF$_4^-$) or Triethyl monomethyl ammonium tetra fluoroborate (TEMA$^+$BF$_4^-$), ammonium salts, amine salts, and amidine salts etc. are preferably used. Note that, one of the electrolytes may be independently used and two or more thereof may be used at the same time.

Also, as the organic solvent, a known solvent can be used. As the organic solvent, for example, propylene carbonate, ethylene carbonate, dimethycarbonate, methyethyl carbonate, diethyl carbonate, γ-butyrolactone, dimethylformamide, sulfolane, acetonitrile, propionitrile, and methoxyacetonitrile are preferably exemplified. These may be used independently and may be used by mixing two or more thereof by a certain ratio.

As shown in FIG. 2, the tips of the lead terminals 18 and 28 are drawn to the outside of the first seal part 40 and the second seal part 42 by going through the first seal part 40 and the second seal part 42, respectively. The first seal part 40 and the second seal part 42 are where each of the lead terminals 18 and 28 is drawn to the outside and are required to have special sealability compared with the third seal part 43 and the fourth seal part 44.

Figure 3:
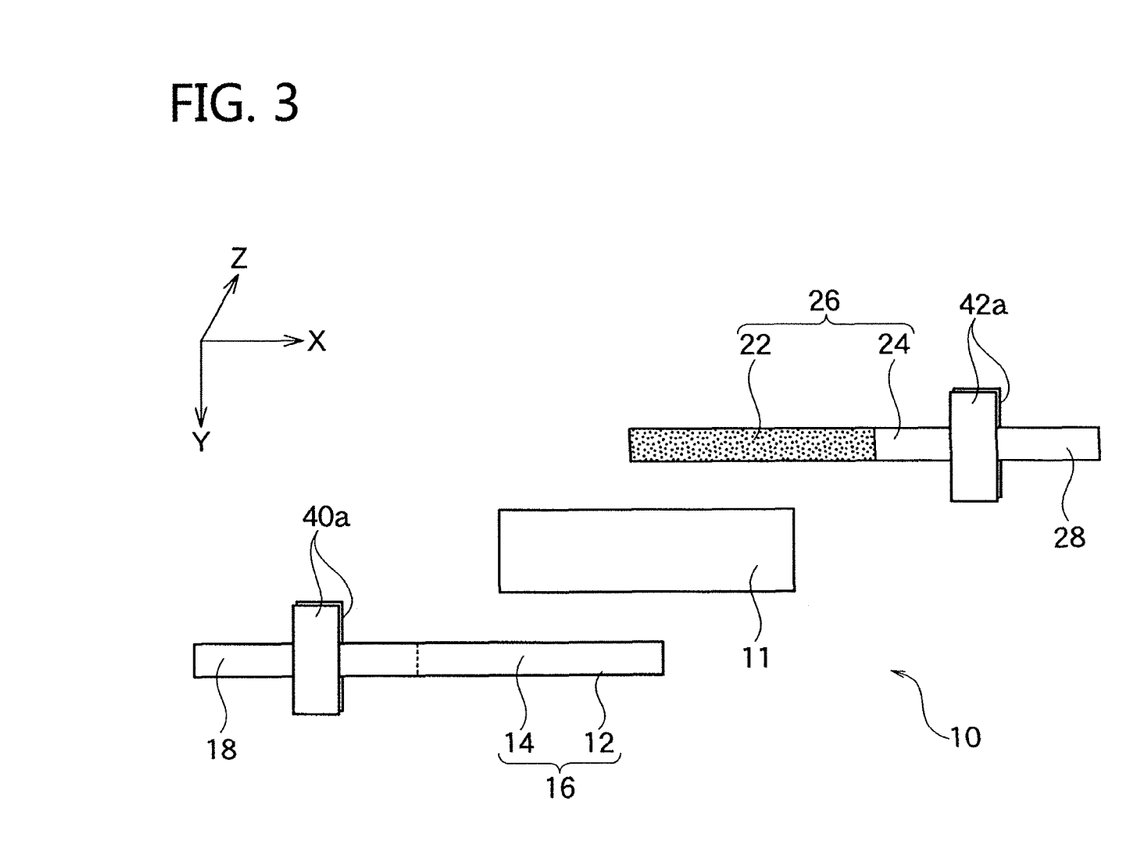
FIG. 3 is a schematic perspective view showing an example of a process for manufacturing the electric double-layered capacitor shown in FIG. 1A.
Figure 4A:
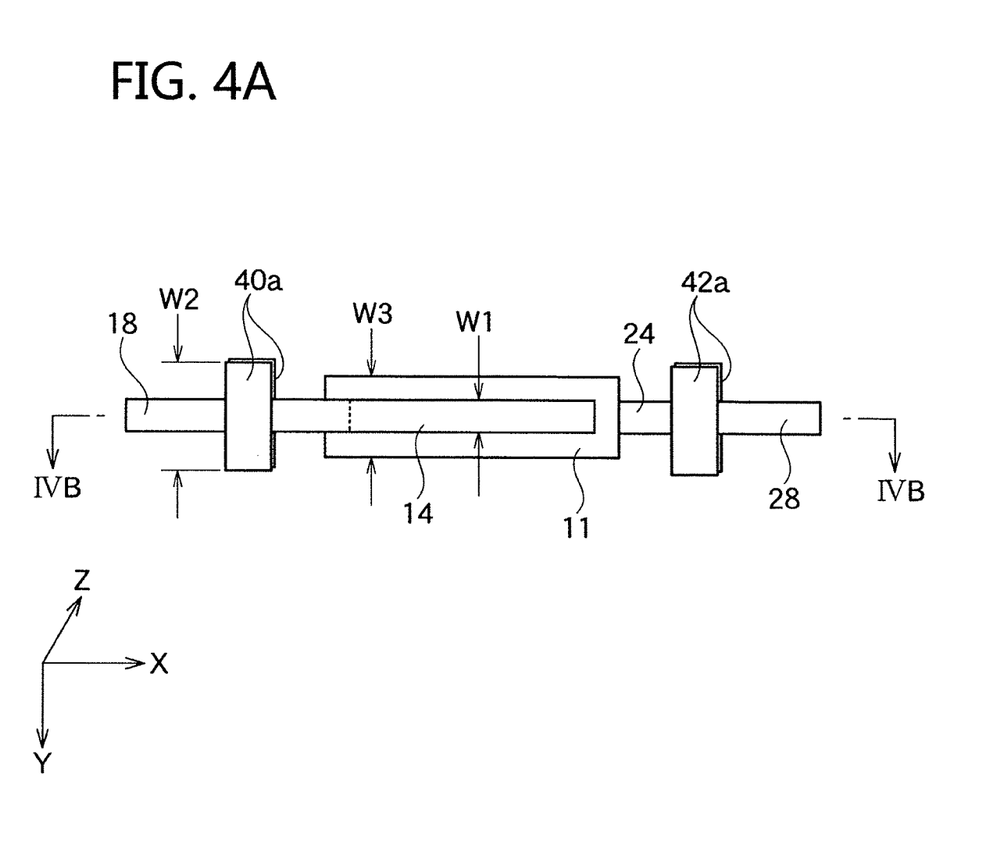
FIG. 4A is a perspective view showing a continued process from FIG. 3.

Each of the width in the Y-axis direction regarding the lead terminals 18 and 28 shown in FIG. 3 and FIG. 4 may be the same or different. Also, when the lead terminals 18 and 28 are integrally formed with the current collector layers 14 and 24 respectively, the width in the Y-axis direction regarding the lead terminals 18 and 28 may be approximately the same as the Y-axis direction width W1 of the current collector layers 14 and 24 and may be smaller or larger than the width W1.

The Y-axis direction width W1 of the current collector layers 14 and 24 is preferably 2 to 10 mm and is preferably smaller than the Y-axis direction width W3 of the separator layer 11. W3-W1 is preferably 0.2 to 2 mm. The current collector layers 14 and 24 are preferably arranged at the center in the Y-axis direction of the separator layer 11.

Also, when the EDLC 2 is housed in an IC card, the width W0 in the Y-axis direction of the EDLC 2 shown in FIG. 1A is preferably 10 to 50 mm. The length L0 in the X-axis direction of the EDLC 2 except for the lead terminals 18 and 28 is preferably 10 to 50 mm.

Figure 6:
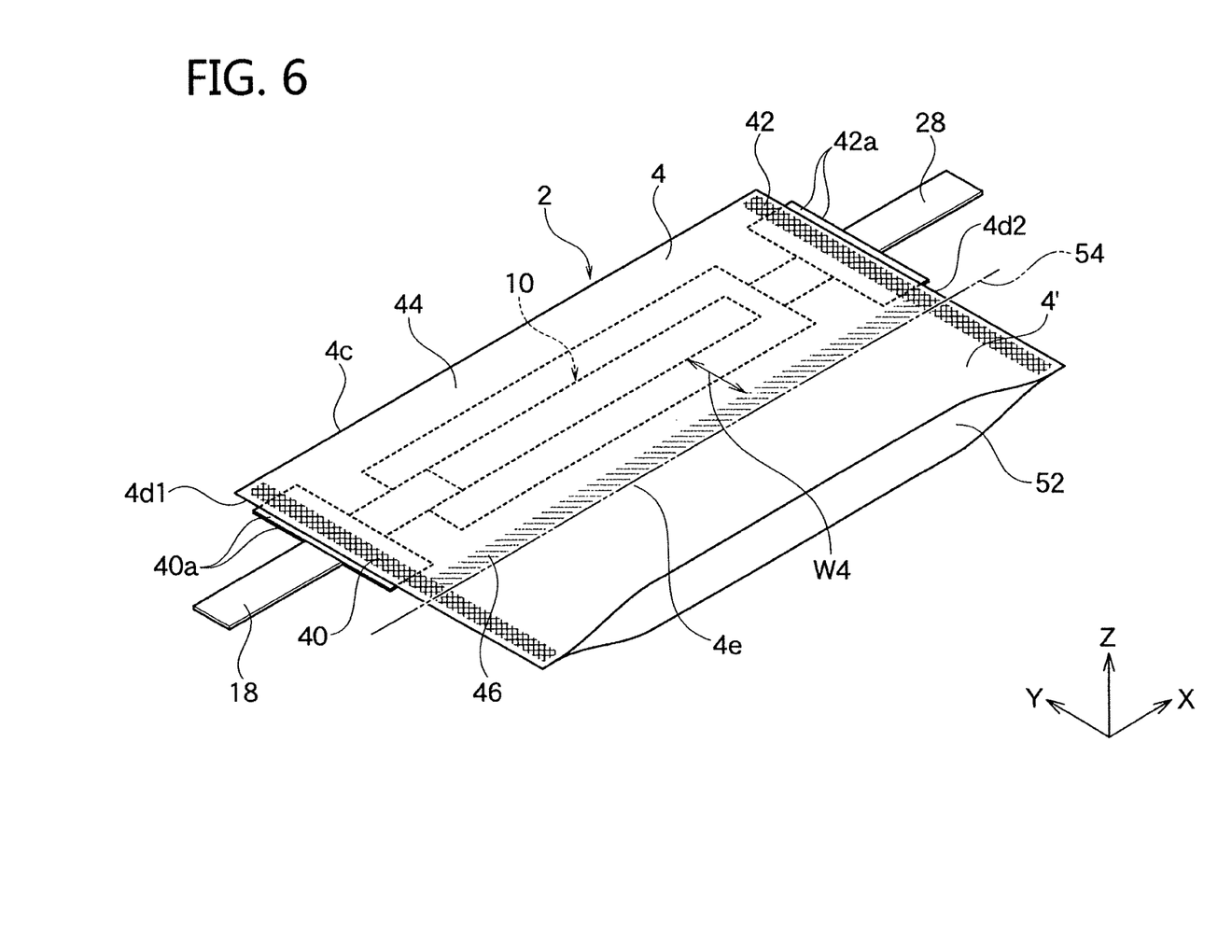
FIG. 6 is a perspective view showing a continued process from FIG. 5.

In the present embodiment, as shown in FIG. 6 mentioned below, the first seal part 40 and the second seal part 42 are formed by integrating the sealing tapes 40a and 42a with the peripheral edges 4d1 and 4d2 of the exterior sheet 4 by heat of thermal sealing. At that time, the inner sheets 4B formed on an inner peripheral surface of the exterior sheet 4 are also integrated, which improves the sealability at the first seal part 40 and the second seal part 42.

Also, the third seal part 44 is made by bending the exterior sheet 4 at the folding peripheral edge 4c of the exterior sheet 4 and is integrated by fusion of the contacted inner sheets 4B of the exterior sheet 4 caused by heat during thermal sealing. The fourth seal part 46 is integrated by fusion of the contacted inner sheets 4B of the respective side peripheral edges 4e of the surface 4a and the rear surface 4b of the exterior sheet 4, caused by heat during thermal sealing.

At the both ends in the Y-axis direction of the first seal part 40, the first seal part 40 is continuously formed to connect the respective ends of the third seal part 44 and the fourth seal part 46 with the both ends of the first seal part 40. The second seal part 42 is continuously formed to connect the other ends of the third seal part 44 and the fourth seal part 46 with the both ends of the second seal part 42. Thus, the inside of the exterior sheet 4 is favorably sealed from the outside of the exterior sheet 4.

In the EDLC 2 of the present embodiment, the first lead tell final 18 and the second lead terminal 28 of the element body 10 are drawn to the opposite side along the longitudinal direction (X-axis direction) of the EDLC 2. Thus, it is possible to reduce the Y-axis direction width of the EDLC 2, the thickness of the first seal part 40 and the second seal part 42 to the necessary minimum, and further the thickness of the whole EDLC 2 as well. Thus, the EDLC 2 can be downsized and thinned.

In the EDLC 2 of the present embodiment, for example, the first lead terminal 18 is defined as a cathode, the second lead terminal 28 is defined as an anode, and they are connected to the element body 10 immersed in the electrolyte solution. With respect to EDLCs, maximum resistance voltage of a single element is determined as 2.85 V or so, and elements may be connected in series to improve the resistance voltage according to the usage. Since the EDLC 2 of the present embodiment is extremely thin and has enough resistance voltage, it can be preferably used as a battery for being included in thin electric components such as IC cards.

Next, by using FIG. 3 to FIG. 6, one example of the manufacturing process for the EDLC 2 of the present embodiment will be described.

Figure 4B:
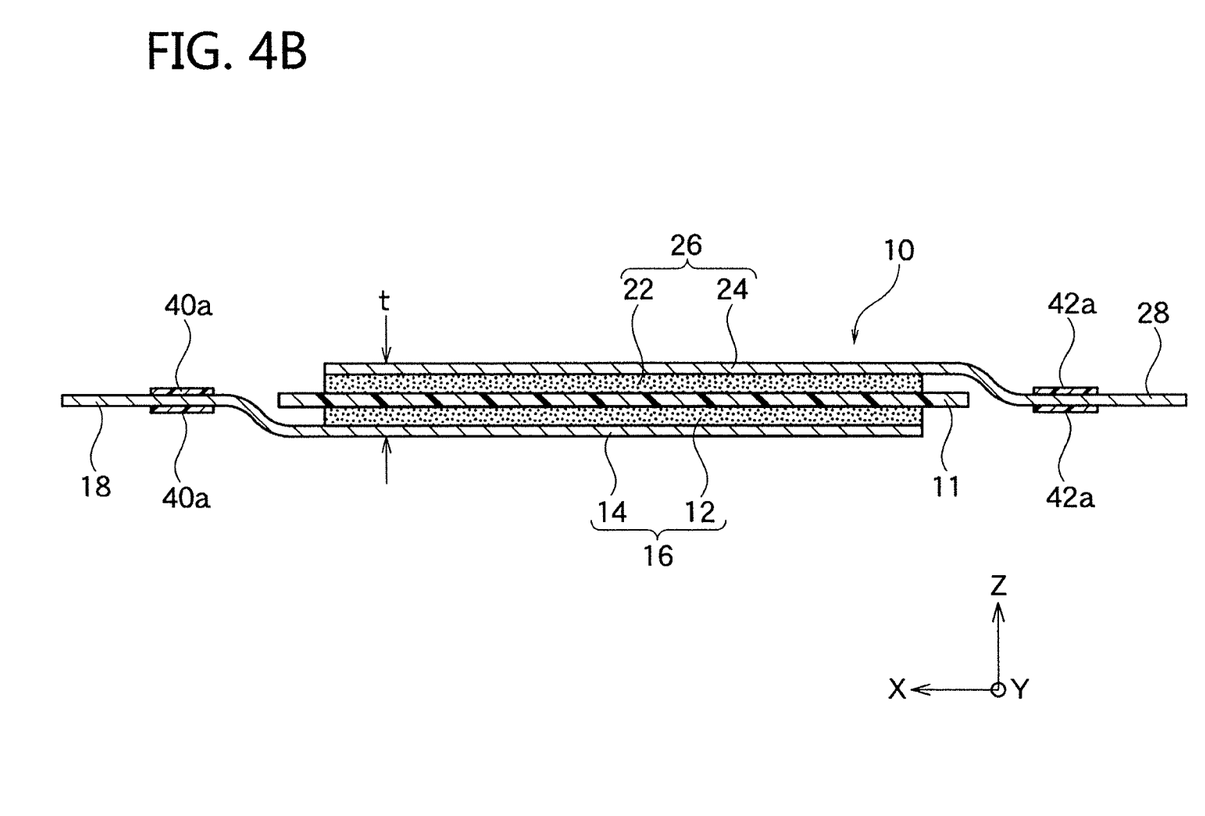
FIG. 4B is a schematic cross-sectional view taken along IVB-IVB line of FIG. 4A.

First, as shown in FIG. 3, FIG. 4A and FIG. 4B, the element body 10 is manufactured. As shown in FIG. 3, in order to manufacture the element body 10, the first inner electrode 16 and the second inner electrode 26 are arranged on the surface and the rear surface of the separator layer 11. The inner electrodes 16 and 26 are laminated on the both sides of the separator layer 11 to be contacted by the activation layers 12 and 22, respectively.

With respect to the respective lead terminals 18 and 28, the sealing tapes 40a and 42a are bonded at X-axis direction positions to be the above-mentioned first seal part 40 and the second seal part 42 so as to sandwich the respective terminals 18 and 28. The width W2 in the Y-axis direction of the tapes 40a and 42a is preferably 0.5 to 3 mm longer than the Y-axis direction width of the lead terminals 18 and 28. The width in the Y-axis direction of the tapes 40a and 42a corresponds to the width in the Y-axis direction of the first seal part 40 and the second seal part 42 of the EDLC 2 shown in FIG. 1A and further defines the Y-axis direction width W0 of the EDLC 2.

When the width W2 in the Y-axis direction of the tapes 40a and 42a shown in FIG. 4A is too small, the sealability at the first seal part 40 and the second seal part 42 shown in FIG. 1A may not be enough. When too large, the Y-axis direction width W0 of the EDLC 2 is large more than necessary. The width in the X-axis direction of the tapes 40a and 42a corresponds to the length L1 in the X-axis direction of the first seal part 40 and the second seal part 42 shown in FIG. 2 and is preferably 2 to 4 mm.

Figure 5:
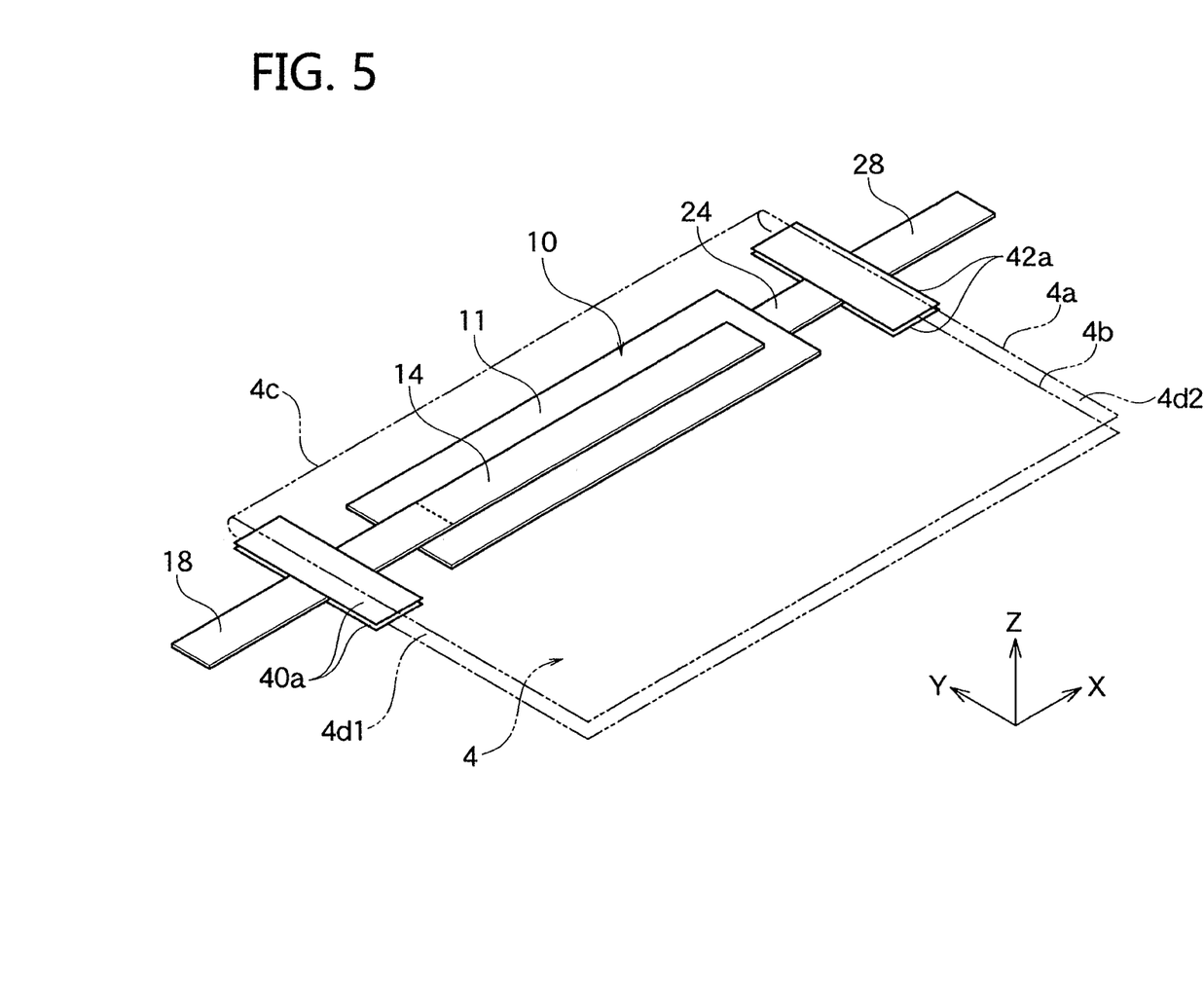
FIG. 5 is a perspective view showing a continued process from FIG. 4.

Next, as shown in FIG. 5, by folding and bending the exterior sheet 4 at the peripheral edge 4c to cover the whole element body 10, it is covered with the surface 4a and the rear surface 4b of the sheet. Note that, the exterior sheet 4 is formed to be long in the Y-axis direction in advance. The width in the X-axis direction of the exterior sheet 4 is adjusted so that the peripheral edge 4d1 at the first seal part side of the exterior sheet 4 overlaps the tape 40a and the peripheral edge 4d2 at the second seal part side of the exterior sheet 4 overlaps the tape 42a.

Next, as shown in FIG. 6, the exterior sheet 4 covering the whole element body 10 is set on a jig that is not shown, the folding peripheral edge 4c of the exterior sheet 4 is heated with pressure, and the third seal part 44 is formed. Next, the peripheral edge 4d1 at the first seal part side and the peripheral edge 4d2 at the second seal part side of the exterior sheet 4 are heated with pressure, and the first seal part 40 and the second seal part 42 are formed.

At that time, the sealing tape 40a and the inner sheets 4B (see FIG. 2) formed on the inner peripheral face of the exterior sheet 4 are also integrated, which improves the sealability at the first seal part 40. Similarly, the sealing tapes 42a and the inner sheets 4B (see FIG. 2) formed on the inner peripheral face of the exterior sheet 4 are also integrated, which improves the sealability at the second seal part 42.

Next, an electrolyte solution is injected from an opening end 52 of the exterior sheet 52 where the fourth seal part 46 is not formed, and then the last fourth seal part 46 is formed by thermal sealing as with the above. Thereafter, the exterior sheet 4 is cut along a cutting line 54 at the outside of the fourth seal part 46, and an unnecessary exterior sheet 4' is removed. As a result, the EDLC 2 of the present embodiment is obtained.

In the manufacturing process of the present embodiment, the sealing tapes 40a sandwiching the first lead terminal 18 is inserted between the peripheral edge parts 4d1 at the first seal part side of the exterior sheet 4 and is thermally sealed. Then, the first seal part 40 is formed. Similarly, the sealing tapes 42a sandwiching the second lead terminal 28 is inserted between the peripheral edge parts 4d2 at the second seal part side of the exterior sheet 4 and is thermally sealed. Then, the second seal part 42 is formed.

By performing thermal sealing, the sealing tapes 40a and the peripheral edges 4d1 of the exterior sheet 4 are integrated by heat, and the sealing of the inside of the exterior sheet 4 is excellent at an extraction part of the lead terminal 18. Also, the thickness of the first seal part 40 can be reduced to a minimum while keeping the sealing favorably. Similarly, by performing thermal sealing, the sealing tapes 42a and the peripheral edges 4d2 of the exterior sheet 4 are integrated by heat, and the sealing of the inside of the exterior sheet 4 is excellent at an extraction part of the lead terminal 28. Also, the thickness of the second seal part 42 can be reduced to a minimum while keeping the sealing favorably.

Since the EDLC 2 of the present embodiment has the above structures, the thickness of the device can be 1 mm or less, preferably 0.8 mm or less, and the device can be thinned. Also, in the EDLC 2 of the present embodiment, proof stress of the exterior sheet 4 is in a predetermined range, and the hardness of the exterior sheet 4 is in a predetermined range. Thus, the EDLC 2 of the present embodiment has enough resistance with respect to repeated bending.

Note that, conventional EDLCs are weak against repeated bending and have generation of wrinkles on exterior bodies. For example, the reason for causing the wrinkles can be explained as follows. When a device is bent, a stress is added to a central portion of an element, a liquid electrolyte solution stored inside the element starts oozing out of the element, and it is collected in a space between the element and a seal. At the time, the stress of the electrolyte solution swells the space largely. When the space is swollen more than a predetermined volume, plastic deformation is caused by excess of the proof stress, and then wrinkles occur. The amount of oozing of the electrolyte solution is determined by an area of the element and the amount of liquid injection and the like.

In this case, when the proof stress of the exterior body (the exterior body's durable deformation stress) is too small, the exterior body does not play its own role because the electrolyte solution may leak to the outside of the exterior body. On the other hand, when the proof stress of the exterior body (the exterior body's durable deformation stress) is made large in a predetermined range, the exterior body can cope with the pressure of the electrolyte solution and can prevent wrinkles from occurring. However, when a material which is soft like rubber and has a high resilience is used for the exterior body, the hardness thereof is too small in spite of having the proof stress. Thus, the exterior body composed of such a material does not play a role as a supporting body, and the inner electrodes are damaged or the current collectors thereof have wrinkles. The wrinkles cause capacity lowering due to reduction of facing area and generation of short circuit due to separator abrasion. Meanwhile, when the hardness is too large, it is difficult to follow a steep deformation of the exterior body sheet such as lead step and element step. As a result, cracks occur.

Accordingly, in order to cope with bending of a device as an exterior body, it needs to satisfy a predetermined proof stress along with having a predetermined hardness. In the EDLC 2 of the present embodiment, since the exterior body sheet has a predetermined proof stress and hardness, neither wrinkles nor cracks and the like occur.

Also, in the present embodiment, the Y-axis direction width of the seal part 40 or 42 corresponding to the length of the Y-axis direction of the sealing tapes 40a and 42a is 2 mm or longer. The larger the width of this seal part is, the more effective the measure of the electrolyte solution is, and bending resistance of the device is then improved. Note that, the width of the seal part 40 or 42 is preferably 5 mm or smaller because the width of the device becomes large in the case of having a large width of the seal part.

Second Embodiment

Figure 1B:
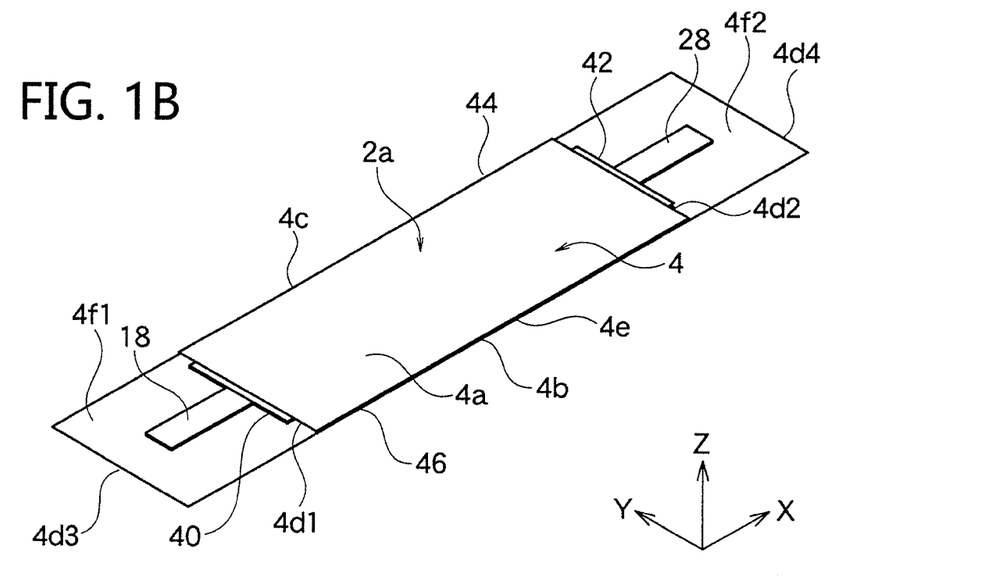
FIG. 1B is a perspective view of the electric double-layered capacitor according to other embodiment of the present invention.

As shown in FIG. 1B, the EDLC 2 of the present embodiment further has support sheets 4f1 and 4f2, which prevent bending of a first lead terminal 18 drawn from the first seal part 40 and a second lead terminal 28 drawn from the second seal part 42. The others are the same as the first embodiment. Thus, the same numbers are distributed to common members in the drawings, and in the following explanation, common members will not be explained partially and different members will be explained in detail.

In the above-mentioned the first embodiment, as shown in FIG. 2, with respect to the peripheral edge 4d1 at the first seal part side of the exterior sheet 4, the surface 4a and the rear surface 4b of the exterior sheet 4 are located at the same position in the X-axis direction. On the other hand, in the present embodiment, as shown in FIG. 1B, the support sheet 4f1 is formed by extending the peripheral edge 4d3 of the exterior sheet 4, which is located on the rear surface 4b of the exterior sheet 4 located at the first seal part 40 of the exterior sheet 4, to the outside in the X-axis direction. The length where the peripheral edge 4d3 of the exterior sheet 4 outwardly protrudes in the X-axis direction toward the first seal part 40 is longer than the length where the first lead terminal 18 outwardly protrudes in the X-axis direction.

Similarly, the support sheet 4f2 is formed by extending the peripheral edge 4d4 of the exterior sheet 4, which is located on the surface 4a or the rear surface 4b of the exterior sheet 4 located at the second seal part 42, to the outside in the X-axis direction. The length where the peripheral edge 4d4 of the exterior sheet 4 outwardly protrudes in the X-axis direction from the second seal part 42 is longer than the length where the second lead part 28 outwardly protrudes in the X-axis direction.

By having such structures, the support sheets 4f1 and 4f2 are easily formed. Also, by having such structures, it is possible to effectively prevent bending of the first lead terminal 18 drawn from the first seal part 40 and the second lead terminal drawn from the second seal part 42. Also, by making the protruding length of the peripheral edge 4d3 or 4d4 of the exterior sheet 4 longer than the protruding length of the lead terminal 18 or 28, there is no possibility that the lead terminal 18 or 28 contacts exposure ends of the metal sheet (metal sheet 2A in FIG. 2) at the peripheral edge 4d3 or 4d4 of the exterior sheet 4. Thus, a short circuit can be definitely prevented.

Also, in the present embodiment, terminal strength can be increased by fixing the first lead terminal 18 and the second lead terminal 28 to the support sheet 4f1 or 4f2 with heat sealing layers, for example. By fixing to the exterior sheet 4f1 or 4f2, positional deviation of terminals becomes hard to occur, and various terminal connections such as ACF connection are facilitated.

Third Embodiment

Figure 7:
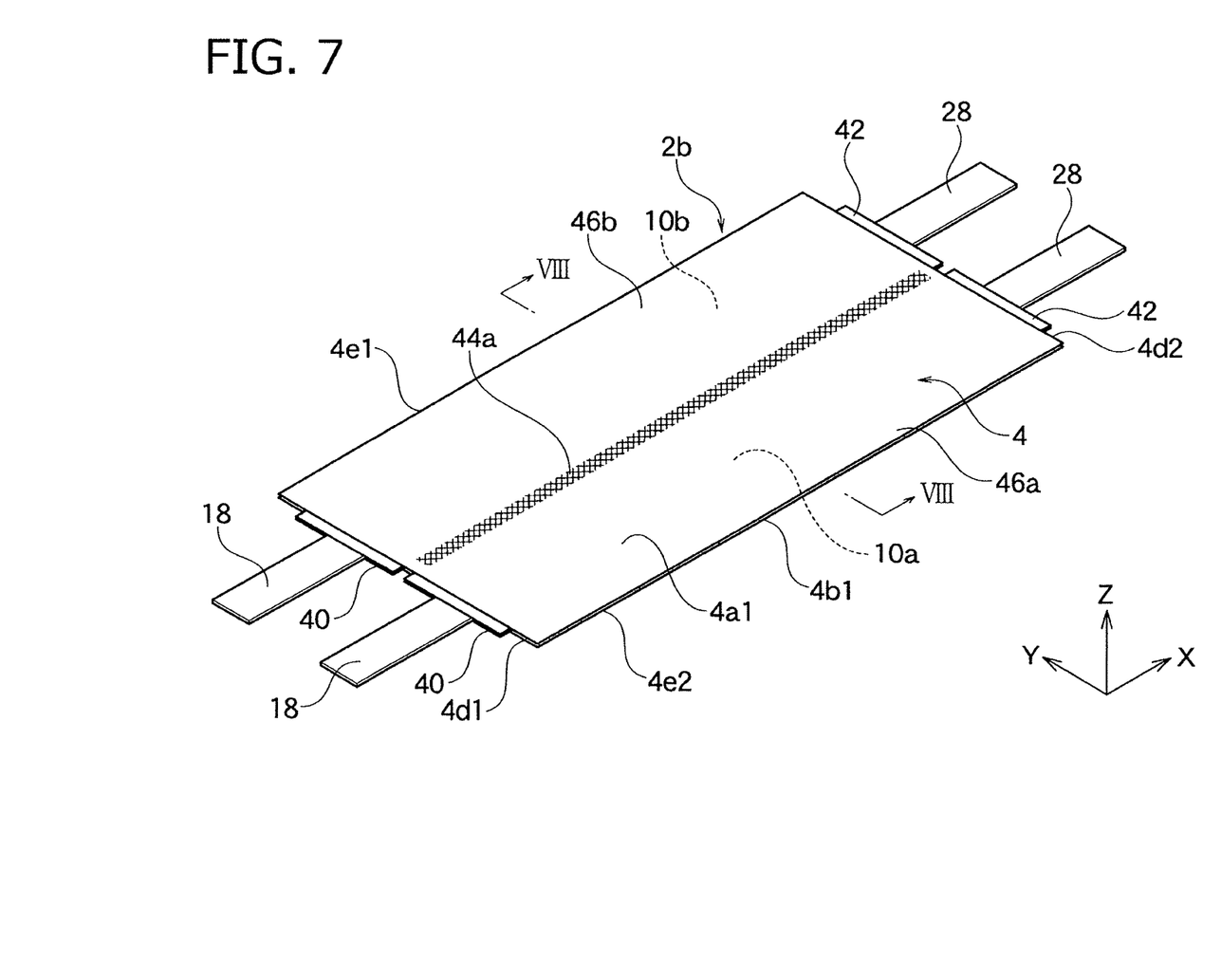
FIG. 7 is a perspective view of the electric double-layered capacitor according to other embodiment of the present invention.

As shown in FIG. 7, in an EDLC 2b of the present embodiment, two element bodies 10a and 10b are included in the exterior sheet 4 in line with the Y-axis direction. The others are the same as the first embodiment. Thus, the same numbers are distributed to common members in the drawings, and in the following explanation, common members will not be explained partially and different members will be explained in detail.

Figure 8:
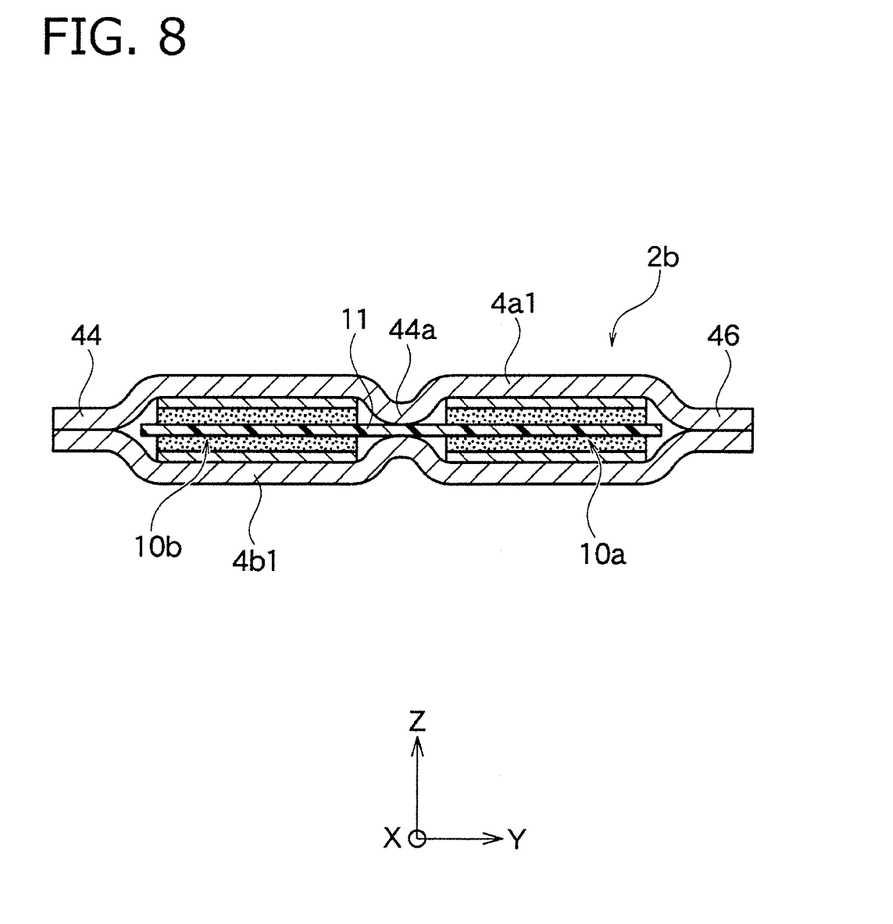
FIG. 8 is a main cross-sectional view taken along VIII-VIII line of FIG. 7.

In the present embodiment, as shown in FIG. 7, the exterior sheet 4 is provided with a surface sheet 4a1 and a rear surface sheet 4b1 and has an approximately double size in the Y-axis direction compared with the exterior sheet 4 shown in FIG. 1A. As shown in FIG. 8, the two element bodies 10a and 10b are included in the exterior sheet 4, and the separator layer 11 is shared by the two element bodies 10a and 10b. The element bodies 10a and 10b respectively have the same structure as the element body 10 of the first embodiment except that the separator layer 11 is shared thereby. Note that, in the present embodiment, a single separator layer 11 may not be necessarily used, but respective separator layers 11 may be used with respect to each of the element bodies 10a and 10b.

A third seal part 44*a* is formed along the X-axis direction at the center in the Y-axis direction of the exterior sheet 4, which makes cutoff of the flow of the electrolyte solution between the element bodies 10*a* and 10*b*. A space where the element body 10*a* is housed is sealed by the first seal part 40, the second seal part 42, the third seal part 44*a*, and a fourth seal part 46*a*, which are continuously formed on the exterior sheet 4, and the electrolyte solution is stored therein. Similarly, a space where the element body 10*b* is housed is sealed by the first seal part 40, the second seal part 42, the third seal part 44*a*, and a fourth seal part 46*b*, which are continuously formed on the exterior sheet 4, and the electrolyte solution is stored therein.

Next, by using FIG. 9 to FIG. 10, an example of the manufacturing process for the EDLC 2 of the present embodiment will be described.

Figure 9:
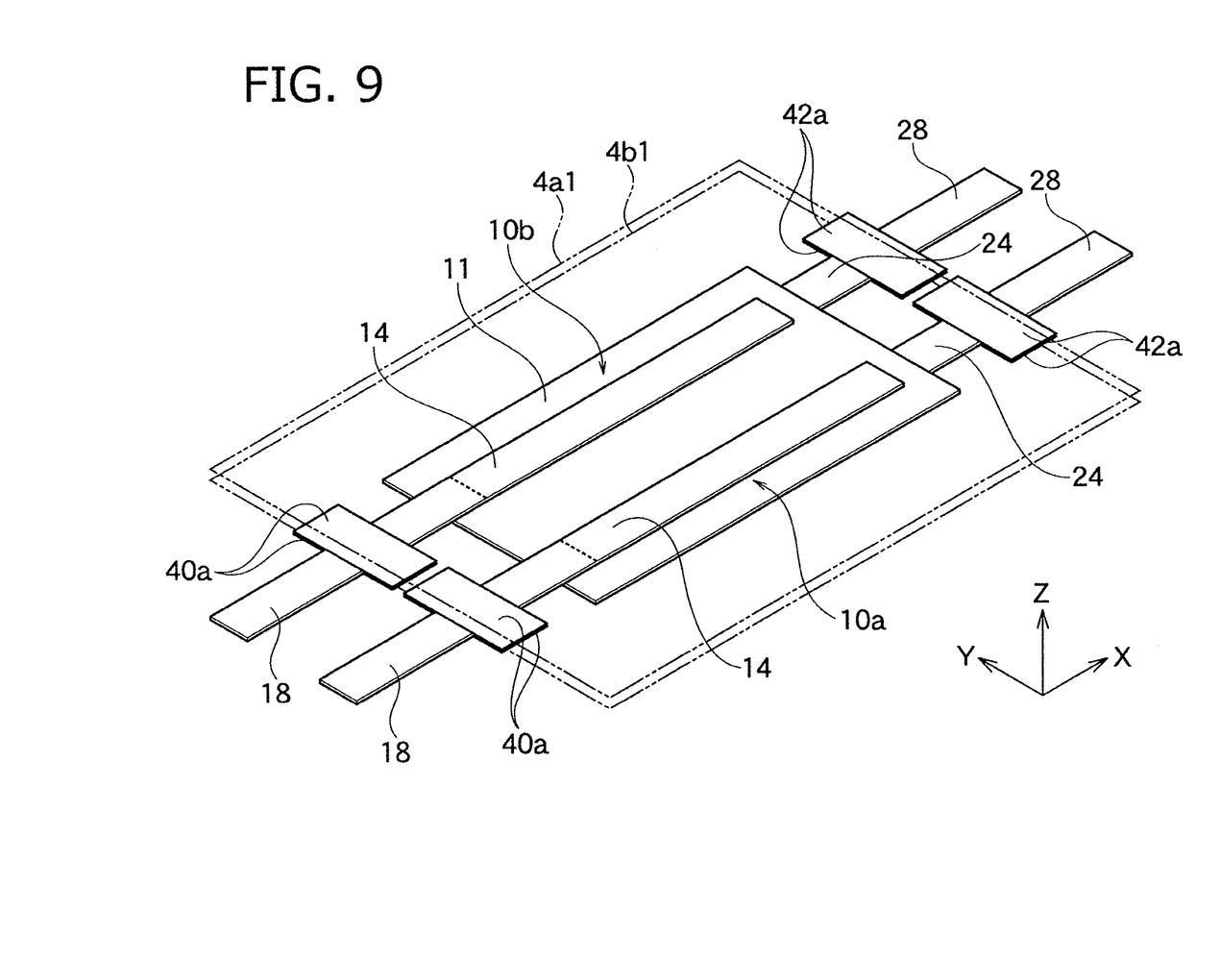
FIG. 9 is a schematic perspective view showing an example of a process for manufacturing the electric double-layered capacitor shown in FIG. 7.

First, as shown in FIG. 9, the two element bodies 10*a* and 10*b* are formed in line with the Y-axis direction on a single separator layer 11 having a wide width in the Y-axis direction. Note that, the two element bodies 10*a* and 10*b* may be formed by using two separator layers 11. A method for manufacturing the element bodies 10*a* and 10*b* is the same as that of the first embodiment.

Similarly to the embodiments mentioned above, each of the lead terminals 18 and 28 of the element bodies 10*a* and 10*b* is bonded by the sealing tapes 40*a* and 42*a* so as to be sandwiched thereby.

Next, the element bodies 10*a* and 10*b* are covered with the surface sheet 4*a*1 and the rear surface sheet 4*b*1, which constitute the exterior sheet 4 and are combined to entirely cover the element bodies 10*a* and 10*b*. Note that, the exterior sheet 4 is formed longer in the Y-axis direction in advance. The width in the X-axis direction of the exterior sheet 4 is adjusted so that the peripheral edge 4*d*1 at the first seal part side of the exterior sheet 4 overlaps the tape 40*a* and that the peripheral edge 4*d*2 at the second sheet part side of the exterior sheet 4 overlaps the tape 42*a*.

Figure 10:
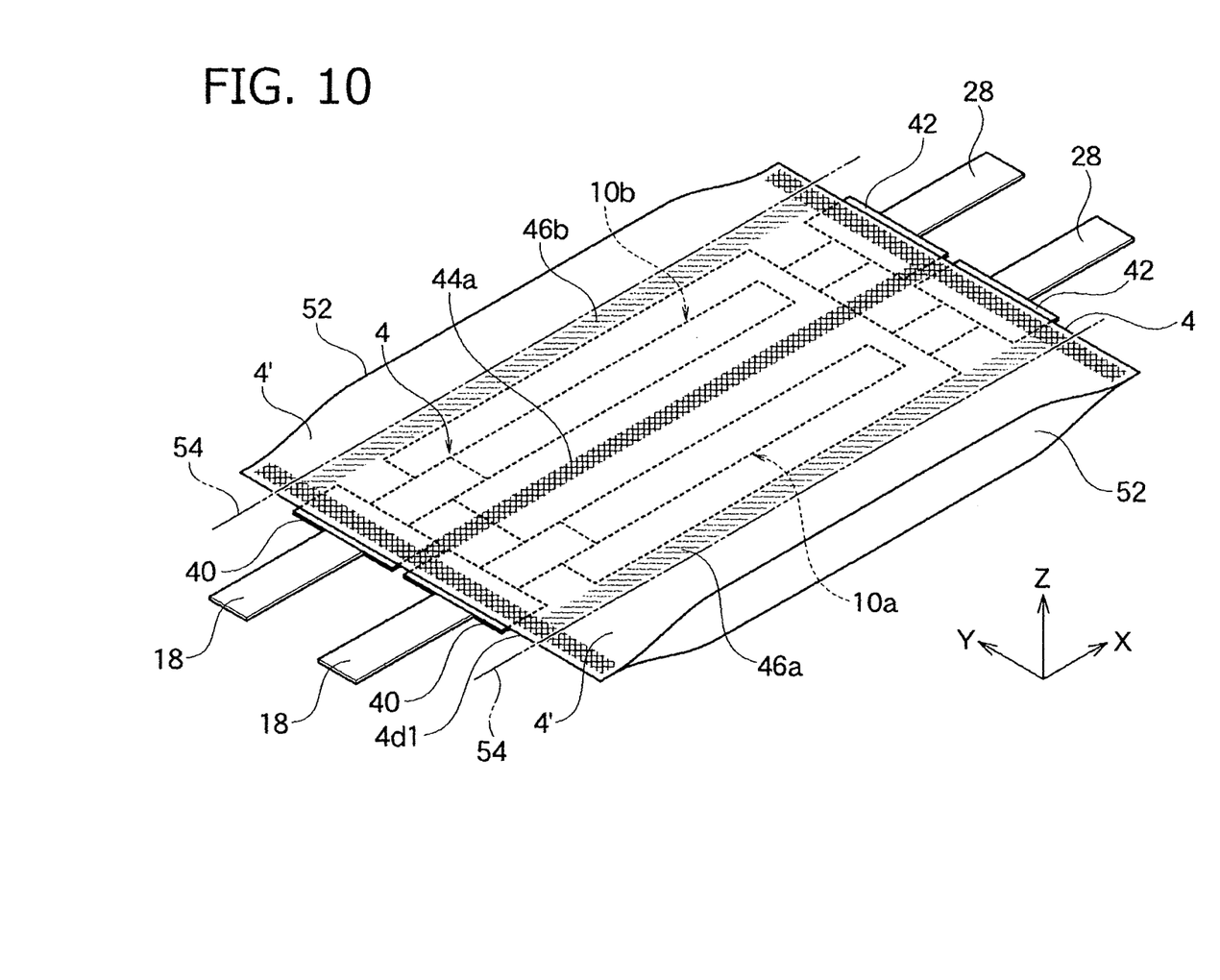
FIG. 10 is a perspective view showing a continued process from FIG. 9.

Next, as shown in FIG. 10, the exterior sheet 4 covering the whole element bodies 10*a* and 10*b* is set on a jig that is not shown, the center in the Y-axis direction of the exterior sheet 4 is heated by pressure along the X-axis direction, so that the third seal part 44*a* is formed. Next, the peripheral edge 4*d*1 of the first seal part side and the peripheral edge 4*d*2 at the second seal part side of the exterior sheet are heated by pressure, and the first seal part 40 and the second seal part 42 are formed.

Next, electrolyte solution is injected from each of opening ends 52 of the exterior sheet 4 where fourth seal parts 46*a* and 46*b* are not formed, and then, the last fourth seal parts 46*a* and 46*b* are formed by thermal sealing as with the above. Thereafter, the exterior sheet 4 is cut along cutting lines 54, which are located at the outer sides of the fourth seal parts 46*a* and 46*b*, and extra exterior sheets 4' are removed. Consequently, the EDLC 2*b* of the present embodiment shown in FIG. 7 is obtained.

Note that, in the above-mentioned embodiments, the lead terminals 18, 18 or 28, 28 having the same polarities are drawn from the same side in the X-axis direction of the exterior sheet 4, but the lead terminals 18, 28 or 28, 18 having different polarities may be also drawn. In the present embodiment, the lead terminals drawn to the same side in the X-axis direction are mutually connected in series or in parallel by a connecting piece, which enables increasing of battery capacity or enhancing of withstand voltage. Also, in the present embodiment, the support sheets 4/1 and 4/2 as shown in FIG. 1B may be provided as well.

Note that, the present invention is not limited to the above embodiments and can be changed variously within the range thereof.

For example, as a laminate-type electrochemical device to which the present invention is applied, it can be applied to not only EDLCs, but also to lithium batteries and lithium battery capacitors and the like.

Hereinafter, the present invention will be explained based on the more detailed example, but the present invention is not limited thereto.

Example 1

The EDLC 2 shown in FIG. 1A was manufactured. A material of the metal sheet 4A (see FIG. 2) of the exterior sheet 4 of the EDLC 2 was changed as shown in Table 1, and the proof stress and the hardness (Hv) of the exterior sheet 4 were changed. Also, in addition to change the thickness t (see FIG. 4B) of the element body 10 as shown in Table 1, the width W4 (see FIG. 6) from an edge part of a pair of electrodes of the element body 10 to the most inner end of the seal part was changed. Then, samples 1 to 30 of EDLC were prepared.

With respect to each of the samples 1 to 30, twenty samples were formed, and bending test was conducted under the following condition. Then, wrinkles thereof were evaluated by sight. When the wrinkles were observed by sight, the sample was judged as defective. The number of defectives is shown in Table 1.

The condition for the bending test was as follows. That is, two PET films having a card size of 80 mm×50 mm were overlapped, and each of the samples were sandwiched between the center thereof. The sandwiched card was bent upwardly for 250 times to obtain the height of 2 cm along the 80 mm direction, and then it was bent downwardly for 250 times. Next, it was bent upwardly for 250 times to obtain the height of 1 cm along the 50 mm direction. Thereafter, it was bent downwardly for 250 times. The test method was performed according to JIS X 6305.

TABLE 1

| Sample Number | Material | Proof Stress (N/mm 2) | Hardness (Hv) | W4: (mm) | Thickness t (mm) | Defective (Out of 20) |
|---|---|---|---|---|---|---|
| 1 | Al | 65 | 2.8 | 1 | 0.1 | 20 |
| 2 | Al | 65 | 2.8 | 1 | 0.5 | 20 |
| 3 | Al | 65 | 2.8 | 1 | 1 | 20 |
| 4 | Al | 65 | 2.8 | 0.5 | 0.1 | 20 |
| 5 | Al | 65 | 2.8 | 0.5 | 0.5 | 20 |
| 6 | Al | 65 | 2.8 | 0.5 | 1 | 20 |
| 7 | SUS304 (BA) | 390 | 230 | 1 | 0.1 | 1 |
| 8 | SUS304 (BA) | 390 | 230 | 1 | 0.5 | 2 |
| 9 | SUS304 (BA) | 390 | 230 | 1 | 1 | 13 |

TABLE 1-continued

| Sample Number | Material | Proof Stress (N/mm 2) | Hardness (Hv) | W4: (mm) | Thickness t (mm) | Defective (Out of 20) |
|---|---|---|---|---|---|---|
| 10 | SUS304 (BA) | 390 | 230 | 0.5 | 0.1 | 18 |
| 11 | SUS304 (BA) | 390 | 230 | 0.5 | 0.5 | 18 |
| 12 | SUS304 (BA) | 390 | 230 | 0.5 | 1 | 19 |
| 13 | SUS304 (1/2H) | 785 | 280 | 1 | 0.1 | 0 |
| 14 | SUS304 (1/2H) | 785 | 280 | 1 | 0.5 | 0 |
| 15 | SUS304 (1/2H) | 785 | 280 | 1 | 1 | 0 |
| 16 | SUS304 (1/2H) | 785 | 280 | 0.5 | 0.1 | 17 |
| 17 | SUS304 (1/2H) | 785 | 280 | 0.5 | 0.5 | 19 |
| 18 | SUS304 (1/2H) | 785 | 280 | 0.5 | 1 | 18 |
| 19 | SUS304 (H) | 980 | 380 | 1 | 0.1 | 0 |
| 20 | SUS304 (H) | 980 | 380 | 1 | 0.5 | 0 |
| 21 | SUS304 (H) | 980 | 380 | 1 | 1 | 15 |
| 22 | SUS304 (H) | 980 | 380 | 0.5 | 0.1 | 15 |
| 23 | SUS304 (H) | 980 | 380 | 0.5 | 0.5 | 15 |
| 24 | SUS304 (H) | 980 | 380 | 0.5 | 1 | 16 |
| 25 | SUS304 (HTA) | 1330 | 440 | 1 | 0.1 | 15 |
| 26 | SUS304 (HTA) | 1330 | 440 | 1 | 0.5 | 15 |
| 27 | SUS304 (HTA) | 1330 | 440 | 1 | 1 | 18 |
| 28 | SUS304 (HTA) | 1330 | 440 | 0.5 | 0.1 | 15 |
| 29 | SUS304 (HTA) | 1330 | 440 | 0.5 | 0.5 | 19 |
| 30 | SUS304 (HTA) | 1330 | 440 | 0.5 | 1 | 19 |

As shown in Table 1, it was confirmed that bending defectives could be prevented by appropriately selecting the thickness t1 and the width W4 when the proof stress of the exterior sheet 4 was 390 to 1275 N/mm$^2$, preferably 785 to 980 N/mm$^2$, and the hardness of the exterior sheet was 230 to 380, preferably 280 to 380, in Vickers hardness (Hv). Also, it was confirmed that the bending defectives could be prevented when the thickness t1 was preferably 1 mm or less and more preferably 0.5 mm or less. Further, it was confirmed that the width W4 was preferably 0.5 mm or larger and more preferably 1 mm or larger.

NUMERICAL REFERENCES 2, 2a, 2b . . . electric double-layered capacitor
4 . . . exterior sheet
4a . . . surface
4a1 . . . surface sheet
4b . . . rear surface
4b1 . . . rear surface sheet
4c . . . folding peripheral edge
4d1 . . . peripheral edge at first seal part side
4d2 . . . peripheral edge at second seal part side
4e, 4e1, 4e2 . . . side peripheral edge
10 . . . element body
11 . . . separator layer
12 . . . first activation layer
14 . . . first current collector layer
16 . . . first inner electrode
18 . . . first lead terminal
22 . . . second activation layer
24 . . . second current collector layer
26 . . . second inner electrode
28 . . . second lead terminal
40 . . . first seal part
42 . . . second seal part
44 . . . third seal part
46 . . . fourth seal part

The invention claimed is:

1. An electrochemical device comprising:
an element body in which a pair of a first inner electrode and a second inner electrode are laminated to sandwich a separator layer;
an exterior sheet covering the element body;
a first lead terminal which is electrically connected to the first inner electrode and is drawn to an outside of the exterior sheet; and
a second lead terminal which is electrically connected to the second inner electrode and is drawn to the outside of the exterior sheet, wherein
a proof stress of the exterior sheet is 390 to 980 N/mm$^2$ in JIS Z2241,
a hardness of the exterior sheet is 230 to 380 Hv in Vickers hardness (JIS Z2244),
a thickness t of the element body is 0.5 mm or less, and
a width W4 from an edge part of a pair of electrodes of the element body to a most inner end of a seal part is 1 mm or larger.

2. The electrochemical device as set forth in claim 1, wherein a peripheral edge of the exterior sheet is sealed by the seal part so that the element body is immersed in an electrolyte solution and
the first lead terminal and the second lead terminal are drawn to an outside of the seal part at mutually opposite positions along a longitudinal direction of the first inner electrode and the second inner electrode.

3. The electrochemical device as set forth in claim 2, wherein sealing tapes sandwiching the first lead terminal and the second lead terminal respectively are inserted between the peripheral edges of the exterior sheet and thermally sealed, in order that the seal part is partially formed.

4. The electrochemical device as set forth in claim 3, wherein a width of the seal part corresponding to a length of the sealing tape is 1 mm or more.

5. The electrochemical device as set forth in claim 2, further comprising a support sheet which prevents bending of the first lead terminal and the second lead terminal drawn from the seal part.

6. The electrochemical device as set forth in claim 5, wherein the support sheet is formed by outwardly extending a part of a peripheral edge of the exterior sheet located at the seal part.

7. The electrochemical device as set forth in claim 5, wherein a protruding length of the support sheet is longer than that of the first lead terminal and the second lead terminal.

8. An electrochemical device comprising:
an element body in which a pair of a first inner electrode and a second inner electrode are laminated to sandwich a separator layer;
an exterior sheet covering the element body;
a first lead terminal which is electrically connected to the first inner electrode and is drawn to an outside of the exterior sheet; and
a second lead terminal which is electrically connected to the second inner electrode and is drawn to the outside of the exterior sheet, wherein
a proof stress of the exterior sheet is 390 to 980 N/mm2 in JIS Z2241,
a hardness of the exterior sheet is 230 to 380 Hv in Vickers hardness (JIS Z2244),
a material of a metal sheet of the exterior sheet is SUS304 (BA) or SUS304 (1/2H), and
a width W4 from an edge part of a pair of electrodes of the element body to a most inner end of a seal part is 1 mm or larger.

9. The electrochemical device as set forth in claim 8, wherein a thickness of the element body is 1 mm or less.

10. The electrochemical device as set forth in claim 8, wherein a peripheral edge of the exterior sheet is sealed by a seal part so that the element body is immersed in an electrolyte solution and
the first lead terminal and the second lead terminal are drawn to an outside of the seal part at mutually opposite positions along a longitudinal direction of the first inner electrode and the second inner electrode.

11. The electrochemical device as set forth in claim 10, wherein a thickness of the element body is 1 mm or less.

12. The electrochemical device as set forth in claim 11, wherein sealing tapes sandwiching the first lead terminal and the second lead terminal respectively are inserted between the peripheral edges of the exterior sheet and thermally sealed, in order that the seal part is partially formed.

13. The electrochemical device as set forth in claim 12, wherein a width of the seal part corresponding to a length of the sealing tape is 1 mm or more.

14. The electrochemical device as set forth in claim 11, further comprising a support sheet which prevents bending of the first lead terminal and the second lead terminal drawn from the seal part.

15. The electrochemical device as set forth in claim 14, wherein the support sheet is formed by outwardly extending a part of a peripheral edge of the exterior sheet located at the seal part.

16. The electrochemical device as set forth in claim 14, wherein a protruding length of the support sheet is longer than that of the first lead terminal and the second lead terminal.

17. The electrochemical device as set forth in claim 10, wherein sealing tapes sandwiching the first lead terminal and the second lead terminal respectively are inserted between the peripheral edges of the exterior sheet and thermally sealed, in order that the seal part is partially formed.

18. The electrochemical device as set forth in claim 17, wherein a width of the seal part corresponding to a length of the sealing tape is 1 mm or more.

19. The electrochemical device as set forth in claim 10, further comprising a support sheet which prevents bending of the first lead terminal and the second lead terminal drawn from the seal part.

20. The electrochemical device as set forth in claim 19, wherein the support sheet is formed by outwardly extending a part of a peripheral edge of the exterior sheet located at the seal part.

21. The electrochemical device as set forth in claim 19, wherein a protruding length of the support sheet is longer than that of the first lead terminal and the second lead terminal.

* * * * *